United States Patent

[11] 3,588,846

[72] Inventors Richard H. Linton;
George Y. Sonoda, Poughkeepsie, N.Y.

[21] Appl No 781,528
[22] Filed Dec. 5, 1968
[45] Patented June 28, 1971
[73] Assignee International Business Machines Corporation Armonk, N.Y.

[54] STORAGE CELL WITH VARIABLE POWER LEVEL
4 Claims, 3 Drawing Figs.

[52] U.S. Cl. .......... 340/173, 307 238, 307/279
[51] Int. Cl. .......... G11c11/40, H03k 3/286
[50] Field of Search .......... 340/173; 307/238, 279

[56] References Cited

UNITED STATES PATENTS 3,067,336 12/1962 Eachus .......... 340/173
3,284,782 11/1966 Burns .......... 340/173
3,309,534 3/1967 Yu .......... 340/173

OTHER REFERENCES

IBM Technical Dis. Bul Vol. 10 011 Apr. 1968 pp. 1715–1716 " Associative Memory Cell" Behnke
" Integrated Fast-Read, Slow Write Memory Cell" Keller, IBM Tech. Dis. Bul Vol. 10 01 June, 1967

*Primary Examiner*—Terrell W. Fears
*Attorneys*—Hanifin and Jancin and James E. Murray

ABSTRACT: This specification describes a semiconductor storage cell for use in monolithic memories. The storage cell has two crosscoupled FET's which function as the storage elements of the cell. The crosscoupled FET's are address powered through input/output FET's when the cell is interrogated for reading. When the cell is not being so interrogated, the crosscoupled FET's are supplied power from a source which is connected to each of the crosscoupled FET's by a separate load FET. The gates of those load FET's are biased so the load FET's supply charge to the crosscoupled FET's while the storage cell is not being interrogated but draw charge from the crosscoupled FET's when the crosscoupled FET's are addressed for reading. By biasing the load FET's in this manner, the potential on the drain can be reduced so as to reduce the overall power dissipation of the storage cell.

INVENTORS
RICHARD H. LINTON
GEORGE Y. SONODA

BY James S. Murray

ATTORNEY

STORAGE CELL WITH VARIABLE POWER LEVEL

BACKGROUND OF THE INVENTION

The present invention relates to semiconductor storage cells and more particularly to FET semiconductor storage cells.

One problem with the use of semiconductor bistable circuits as storage cells in monolithic memories for computers is that they cause heating of the monolithic chips on which they are formed. To keep these chips at an operating temperature it is therefore necessary that they be cooled. As the bit density, or the number of cells in a given area of the chips is increased, the heating problems become more critical and very sophisticated and expensive cooling apparatus must be used in order to maintain the memory at an operating temperature level. At even higher bit densities, it becomes impossible to cool the chips with conventional cooling systems. For these reasons dissipation of heat by the cells materially adds to the cost of monolithic computer memories and also is a limiting factor on the speed of operation of the memory and the size of the memory. Therefore, it is desirable to reduce the dissipation of heat by the cells. One method of doing this is to power storage cells at two levels. That is, supply one level of power to the storage cells while the storage cells are being addressed for reading and/or writing and supply another lower level of power to the storage cells while the storage cells are merely storing information.

SUMMARY

The present invention relates to such bilevel powered storage cells and provides a means for reducing the potential supplied to the cells while the cells are merely storing information thereby materially decreasing the power dissipated by the storage cells. As in most monolithic memories the storage cells of the present invention each have two semiconductor devices which are crosscoupled to form a bistable circuit. These storage FET's are address powered through input/output FET's when the cell is interrogated for reading. When the cell is not so interrogated, the storage elements are supplied power from a source which is connected to each of the crosscoupled storage elements by separate load FET's. The gates of these load FET's are biased at a potential which is higher than that of the drain so that the load FET's supply charge to the crosscoupled FET's while the storage cell is not being interrogated but draw charge from the crosscoupled FET's when the crosscoupled FET's are addressed. By biasing the load FET's in this manner, the potential at the drain is reduced to reduce the power dissipation of the storage cell.

Therefore, it is an object of the present invention to provide storage cells which can be fabricated into monolithic memories.

It is also an object of this invention to provide a storage cell which dissipates very little power.

It is a further object of this invention to provide storage cells which operate at two different power levels.

DESCRIPTION OF THE DRAWINGS

The foregoing and other objects, features and advantages of the invention will be apparent from the following more particular description of the preferred embodiment of the invention as illustrated in the accompanying drawings of which:

Referring to FIG. 1, the sources of the crosscoupled FET devices Q1 and Q2 are connected to the grounded terminal of a 2-volt power supply while the drains of both the FET devices Q1 and Q2 are connected through separate load devices Q3 and Q4 to the positive terminal of this same power supply. Thus devices Q1, Q2, Q3 and Q4 constitute a bistable Schmidt trigger circuit in which devices Q1 and Q2 are the active crosscoupled devices of the trigger and the devices Q3 and Q4 are the loads for the active devices.

Information is stored in this bistable trigger circuit in the form of binary "1"'s and "0"'s. A binary "1" is stored in the circuit when device Q1 is conducting and device Q2 is off and a binary "0" is stored in the circuit when device Q2 is conducting and device Q1 is off.

For the purpose of reading or changing the information stored in the bistable trigger circuit, FET device Q5 couples node A of the trigger to the "1" bit sense terminal 12 and FET device Q6 couples node B of the trigger to the "0" bit sense terminal 14. The gates of the FET devices Q5 and Q6 are connected together and to the word line terminal 16 for the cell so that the potentials at node A and B can both be read upon application of a single read pulse to the word line terminal 16. As will be seen later, the signals produced at the "1" and "0" bit sense terminals 12 and 14 as a result of the application of this read pulse are fed into a differential amplifier and compared to see if a "1" or "0" is stored in the cell.

Previously, we mentioned that the potential Vl or the potential at the drains of FET devices Q3 and Q4 was two volts. In accordance with the present invention, the potential V1 on the drains of devices Q3 and Q4 is lower than V2 by at least the operating threshold potential of devices Q3 and Q4. This enables the storage cell to operate on the low 2-volt potential difference between V1 and ground. If the potential V1 on the drains of devices Q3 and Q4 were the same as the potential V2 much larger potential difference, between V1 and ground, would have to be used in order to maintain the information in the storage cell while the cell is not being addressed.

Let us now assume that the cell is not being addressed either for writing or reading and a "1" is stored in the cell. With a "1" stored in the cell, device Q1 is conducting and device Q2 is off. Conduction through device Q1 lowers node A to approximately ground potential while node B remains approximately at 2 volts or at the potential V1. Since the cell is not being addressed, devices Q5 and Q6 are biased off by application of the potential V2 to the bit line terminals 12 and 14 and ground potential to the word line terminal 16. Thus the current to maintain device Q1 conducting flows through devices Q3 and Q4.

Figure 1:
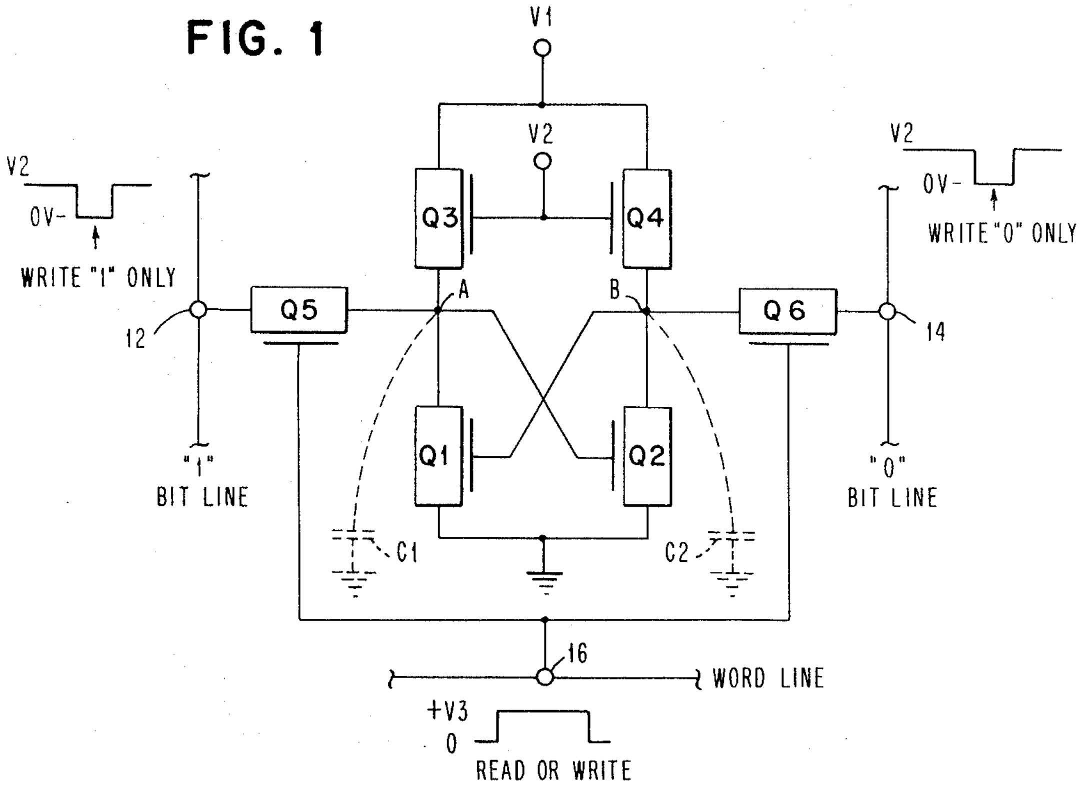
FIG. 1 is a schematic of a storage cell of the present invention.
Figure 2:
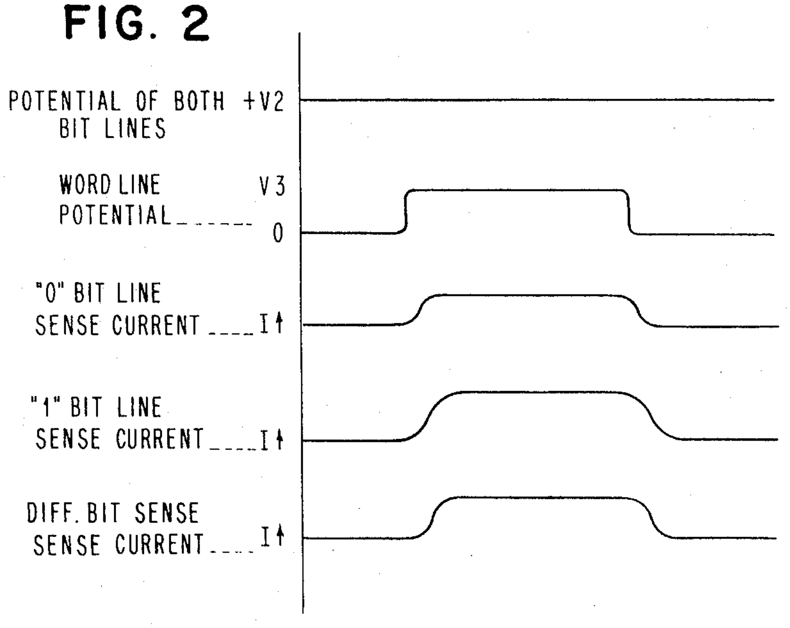
FIG. 2 are curves produced by reading the information stored in the storage cell.

The magnitude of the potentials V1 and V2 and the impedance of devices Q3 and Q4 are selected so that this current is the minimum necessary to maintain the state of the trigger or in other words the minimum necessary to maintain device Q1 on and device Q2 off as a result of the corsscoupling of the drains of devices Q1 and Q2. However, the potential at nodes A and B is not sufficient to permit nondestructive reading of the information stored in the storage cell. To prevent the destruction of the information stored in the cell during reading, the potential of the nodes A and B is raised by excitation supplied to the nodes A and B from the bit terminals 12 and 14. For this purpose the potential at the bit terminals 12 and 14 is maintained at +V2 (approximately 4 volts). Then devices Q5 and Q6 are turned on by a positive interrogation pulse V3 applied to the word terminal 16. This reduces the impedance of devices Q5 and Q6 allowing current to flow to the nodes A and B from the terminals 12 and 14. As current flows from terminal 12 to the "on" node A, the potential at node A rises. Similarly, as current flows from terminal 14 to the "off" node B, the potential at node B rises. These currents flow along bit lines 18 and 20 to a differential sense amplifier 22 where they are subtracted to provide a differential sense current which identifies the information stored in the cell. FIG. 2 shows the sequence of voltages and currents occurring during a read "1" cycle.

As the "off" node B rises in potential during a read cycle, current starts flowing through device Q4 away from node B towards the source V1. This current through device Q4 subtracts from the differential sense current. However devices Q3 and Q4 are high impedance devices so that the reduction in differential sense current is less than 10 percent. Furthermore, there is a definite advantage in using a low drain voltage on devices Q3 and Q4 although it permits current to flow away from the nodes A and B during the read and write cycles of the storage cell. The advantage is that it permits a power reduction when compared with the cell in which a common gate and drain power supply for the load devices is provided. The voltage V1 is chosen so it is at least one threshold level below V2 and as such the power dissipation by the cell is reduced by 2.3 times over the same cell with the common gate and drain power supply. This power reduction figure is based on the use of N channel enchancement mode MOSFET devices as the devices Q1, Q2, Q3, Q4, Q5 and Q6.

Figure 3:
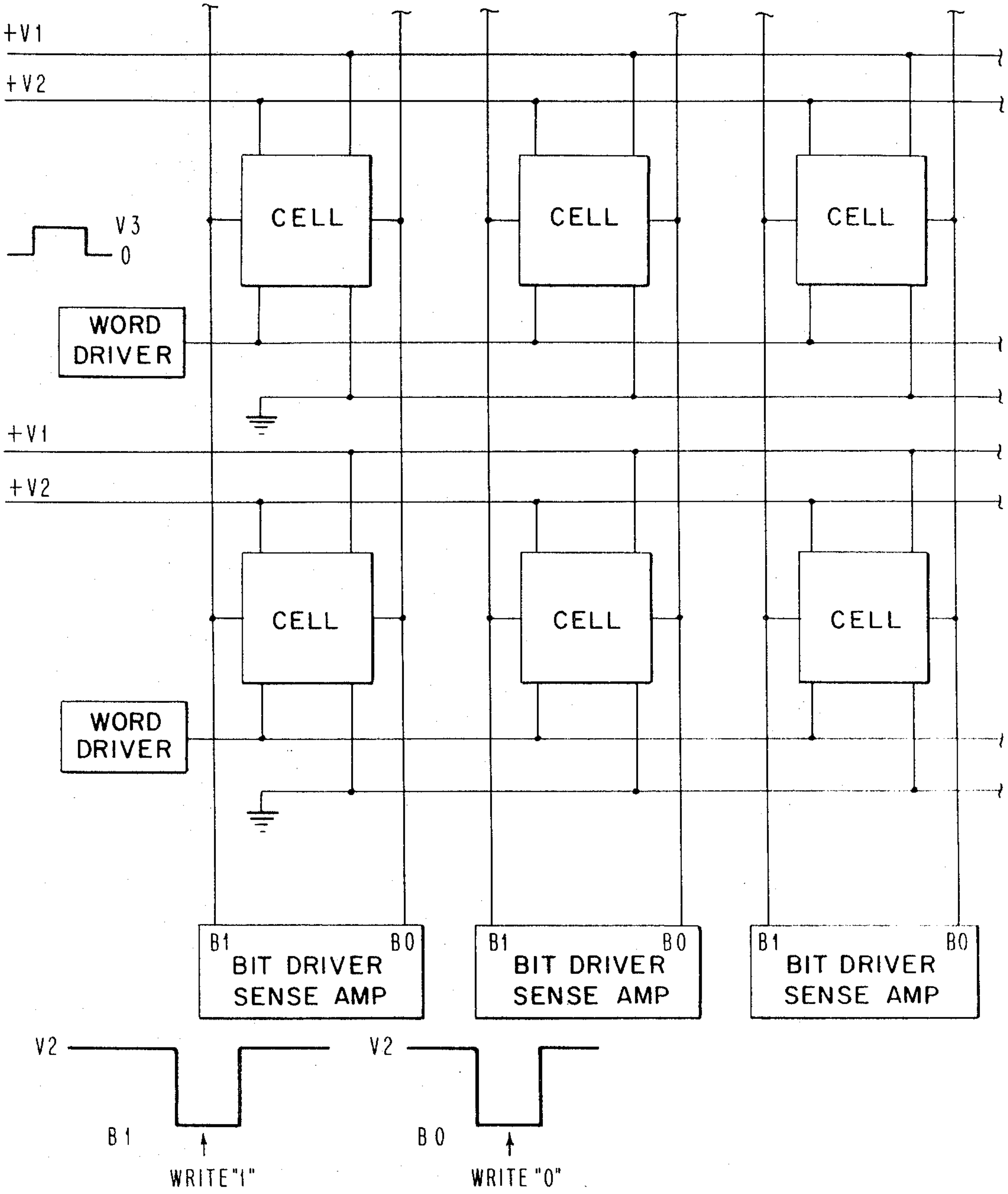
FIG. 3 is a schematic illustrating how the storage cell of the present invention may be hooked into matrices so as to form memory arrays.

So far we have described how to read the information stored in the storage cell. To change the information stored in the cell or in other words to write a "O" into the cell, the potential of "0" bit terminal 14 is lowered to ground potential while the potential on the "1" bit terminal is maintained at +V2. Then a positive interrogation pulse is applied to the word terminal 16 to turn devices Q5 and Q6 on. With terminal 14 biased at ground potential capacitor C2 discharges rapidly towards ground potential through device Q5. As node B drops from +V1 towards ground potential, the potential at node A starts rising starting a regenerating action that ends in device Q2 being turned on the device Q1 being turned off. Device Q5 and Q6 may then be turned off leaving the cell in its "0" storage state. To switch from the "0" storage state to the "1" storage state a similar process is employed except this time the potential at terminal 12 is decreased to lower the voltage at node A while devices Q5 and Q6 are conducting. This will turn device Q2 off which raises the voltage at node B and allows device Q1 to go on. Multiplicity of the above described cells can be coupled together as shown in FIG. 3 and used to form matrices that perform memory functions.

While the invention has been particularly shown and described with reference to preferred embodiments thereof, it will be understood by those skilled in the art that various changes in form and details may be made therein without departing from the spirit and scope of the invention.

We claim:

1. In a storage cell having a pair of crosscoupled FET devices each connected to a separate load FET device for the receipt of driving potential and to bit and sense lines by an input/output FET device to permit the cell to be interrogated and sensed nondestructively, the improvement which comprises:

a. first voltage source means coupled through the controlled terminals of said load FET devices to the crosscoupled FET devices for supplying a first voltage to said bistable circuit, said voltage being sufficient to maintain the state of the bistable circuit while the cell is not being interrogated but being insufficient to permit the cell to be interrogated for reading;

b. second voltage source means coupled to the gates of the load FET devices for supplying a second voltage to the gates of said load FET devices, said second voltage being at least one threshold level greater in magnitude than the first voltage to permit the first voltage to retain the state of the cell at a potential which is smaller in magnitude than would be required to retain the state of the cell if the first and second voltages were equal; and c. third voltage source means coupled to the bit lines for supplying a third voltage to the bistable circuit through said input/output FET devices only while the bistable circuit is being interrogated, said third voltage being larger in magnitude than said first voltage and being sufficient to permit the data in the storage cell to be sensed nondestructively and also sufficient to cause current to pass through the load FET devices in a direction opposite to that which the current flows when the storage cell is not being interrogated whereby the power dissipated by the storage cell is reduced.

2. The storage cell of claim 1 wherein the first of the controlled terminals of each of the load FET devices is connected to the other terminal of the first source of potential, the other controlled terminal of each of the load FET devices is connected to a different one of the gates of the crosscoupled FET devices, and the gates of the load FET devices are biased at least one threshold level greater in magnitude than the potential at said first of the control terminals of the load FET DEVICES.

3. The storage cell of claim 2 wherein the first of the controlled terminals of each of the input/output FET devices is connected to a different one of the gates of the crosscoupled FET devices, the second of the controlled terminals of each of the input/output FET devices is connected to a different one of the sense lines and the gates of the input/output FET's are connected to the interrogation line.

4. The storage cell of claim 3 wherein the impedance of the load FET devices is high enough to limit the decrease in differential sense current in the bit sense lines to no more than 10 percent of the highest value.